United States Patent [19]

Erickson et al.

[11] Patent Number: 5,243,164

[45] Date of Patent: Sep. 7, 1993

[54] BEVERAGE MAKER

[75] Inventors: Laurence R. Erickson; Michael A. Babinec; Judy J. Gunderson, all of Midland, Mich.; M. Gary Grossman, Riverside, Conn.; Edward H. Meisner, Short Hills, N.J.

[73] Assignees: GEE Associates, Edgewater, N.J.; Dowbrands, Inc., Indianapolis, Ind.

[21] Appl. No.: 627,655

[22] Filed: Dec. 14, 1990

[51] Int. Cl.⁵ .............................................. H05B 6/80
[52] U.S. Cl. ..................... 219/10.55 E; 219/10.55 R; 99/DIG. 14; 99/300; 99/306; 426/241; 426/243; 426/433; 426/234; 426/77
[58] Field of Search ............... 219/10.55 E, 10.55 A, 219/10.55 R; 99/DIG. 14, 306, 283, 295, 323, 316, 300; 426/115, 77, 241, 243, 234, 433, 107, 113, 79

[56] References Cited

U.S. PATENT DOCUMENTS

| | | | |
|---|---|---|---|
| 2,000,309 | 5/1935 | Wentorf | 99/306 |
| 2,292,101 | 8/1942 | Brown | 426/77 |
| 2,292,853 | 8/1942 | Wilcox | 99/283 |
| 2,560,523 | 7/1951 | Efford | 222/146.2 |
| 2,601,067 | 6/1952 | Spencer | 99/292 |
| 2,615,384 | 10/1952 | Ranz | 99/295 |
| 2,743,664 | 5/1956 | Dale | 99/295 |
| 3,063,359 | 11/1962 | Brant | 99/306 |
| 3,083,101 | 3/1963 | Nowry | 426/113 |
| 3,094,917 | 6/1963 | Rombouts | 99/323 |
| 3,097,787 | 7/1963 | Schur | 426/77 |
| 3,293,048 | 12/1966 | Kitterman | 426/113 |
| 3,333,527 | 8/1967 | Bender | 99/306 |
| 3,336,142 | 8/1967 | Lawson | 219/10.55 A |
| 3,391,632 | 7/1968 | Colonna | 99/295 |
| 3,410,697 | 11/1968 | Stephenson | 426/114 |
| 3,442,199 | 5/1969 | McGrail | 99/306 |
| 3,465,873 | 9/1969 | Munz | 446/114 |
| 3,587,444 | 6/1971 | Godel | 99/305 |
| 3,589,272 | 6/1971 | Bouladoa | 99/295 |
| 3,672,916 | 6/1972 | Virnig | 426/114 |
| 3,694,235 | 9/1972 | Siegel | 99/295 |
| 3,695,168 | 10/1972 | Van Brunt | 99/306 |
| 3,743,520 | 7/1973 | Croner | 426/115 |
| 3,796,813 | 3/1974 | Kurland | 426/132 |
| 3,868,218 | 2/1975 | Tornmarck et al. | 426/88 |
| 3,937,134 | 2/1976 | Molenaar et al. | 426/77 |
| 3,985,069 | 10/1976 | Cavalluzzi | 99/295 |
| 4,006,820 | 2/1977 | Smith | 206/219 |
| 4,023,164 | 5/1977 | Delaney | 169/23 |
| 4,104,957 | 8/1978 | Freedman et al. | 99/283 |
| 4,132,239 | 1/1979 | Bowen et al. | 99/305 |
| 4,136,202 | 1/1979 | Favre | 99/295 |
| 4,166,208 | 8/1979 | Martel et al. | 99/DIG. 14 |
| 4,167,136 | 9/1979 | Chupurdy | 99/306 |
| 4,167,899 | 9/1979 | McCormick | 99/316 |
| 4,190,077 | 2/1980 | Bowen et al. | 99/305 |
| 4,207,725 | 6/1980 | Smith | 206/219 |

(List continued on next page.)

FOREIGN PATENT DOCUMENTS 177281A 4/1986 European Pat. Off.
0320679 6/1989 European Pat. Off.

OTHER PUBLICATIONS

G. B. Raffetto Ads "Coffee in a Filter" and Cafe Filtre.

*Primary Examiner*—Bruce A. Reynolds
*Assistant Examiner*—Tu Hoang
*Attorney, Agent, or Firm*—George P. Hoare, Jr.; Shea & Gould

[57] ABSTRACT

A beverage maker having a reservoir for holding liquid and a filter element for holding a substance, such as coffee grounds, for making the beverage. A partition separates the reservoir and filter element and has a heat responsive film. When the liquid in the reservoir is at or reaches a desired brewing temperature, the film opens to allow the flow of the heated liquid from the reservoir into and through the filter element and substance, such as coffee grounds, to produce a freshly brewed beverage, ready for dispensing.

21 Claims, 11 Drawing Sheets

U.S. PATENT DOCUMENTS

| | | | |
|---|---|---|---|
| 4,210,674 | 7/1980 | Mitchell | 219/10.55 E |
| 4,226,330 | 10/1980 | Butler | 206/219 |
| 4,233,325 | 11/1980 | Slangan et al. | 219/10.55 E |
| 4,303,196 | 12/1981 | Raines et al. | 99/283 |
| 4,306,492 | 12/1981 | Zimmermann | 99/287 |
| 4,345,512 | 8/1982 | Moore | 219/10.55 E |
| 4,348,421 | 9/1982 | Sakakibara et al. | 426/115 |
| 4,381,696 | 5/1983 | Koral | 99/306 |
| 4,386,109 | 5/1983 | Bowen et al. | 99/307 |
| 4,404,241 | 9/1983 | Mueller et al. | 219/10.55 R |
| 4,417,504 | 11/1983 | Yamamoto | 426/115 |
| 4,446,158 | 5/1984 | English et al. | 99/306 |
| 4,471,689 | 9/1984 | Piana | 99/295 |
| 4,478,858 | 10/1984 | Baird et al. | 206/205 |
| 4,518,082 | 5/1985 | Ye | 426/115 |
| 4,550,024 | 10/1985 | le Granse | 99/306 |
| 4,577,080 | 3/1986 | Grossman | 219/10.55 E |
| 4,596,713 | 6/1986 | Burdette | 426/113 |
| 4,627,334 | 12/1986 | Shanklin | 99/306 |
| 4,642,443 | 2/1987 | Jorgensen et al. | 219/10.55 E |
| 4,697,502 | 10/1987 | English et al. | 99/299 |
| 4,697,503 | 10/1987 | Okabe et al. | 99/306 |
| 4,720,410 | 1/1988 | Lundquist et al. | 426/113 |
| 4,721,835 | 1/1988 | Welker | 219/10.55 E |
| 4,756,915 | 7/1988 | Dobry | 426/234 |
| 4,806,371 | 2/1989 | Mendenhall | 426/113 |
| 4,883,936 | 11/1989 | Maynard et al. | 219/10.55 F |
| 4,985,300 | 1/1977 | Huang | 426/392 |
| 5,010,221 | 7/1980 | Grossman et al. | 219/10.55 E |
| 5,064,980 | 11/1991 | Grossman et al. | 219/10.55 E |

BEVERAGE MAKER

FIELD OF THE INVENTION

The invention is directed to a convenient, time saving beverage maker. This invention also relates to a relatively inexpensive, simple, disposable, drip-type, microwave coffee maker adapted to dispense freshly brewed coffee directly into a receptacle such as a cup, mug or the like.

BACKGROUND OF THE INVENTION

U.S. Pat. No. 4,577,080 discloses a beverage maker for coffee which is well suited for use in a microwave oven. The coffee maker includes a container having a reservoir for water, a filter element for coffee and a partition between the reservoir and filter element having at least one perforation or aperture therein adapted to be sealed or closed by the use of a non-toxic heat responsive substance until the water reaches brewing temperature. When the desired brewing temperature is reached, the heat responsive substance causes the aperture to open to allow the heated water to flow therethrough into the filter element and contact the coffee grounds to become freshly brewed coffee ready for dispensing.

The present invention relates to hot liquid makers, and preferably coffee makers, in which the partition separating the reservoir and the filter element facilitates the brewing of coffee or other hot liquid beverages.

SUMMARY OF THE INVENTION

The beverage makers of the present invention are well suited for brewing and dispensing coffee and other hot liquid beverages. It is to be understood that the apparatus of the present invention can be used to brew soup, broth, tea, flavored drinks including hot cocoa, hot chocolate and the like in addition to coffee. For convenience, however, the present invention will be hereinafter particularly described in connection with the brewing of coffee.

The apparatus of the invention includes a container having a reservoir for water, a filter element for coffee grounds, and a partition which separates the reservoir and filter element until the water reaches a desired brewing temperature. The partition includes a film sensitive to heat which is adapted to open communication between the reservoir and the filter element when the water is heated to a desired brewing temperature. As the film opens communication between the reservoir and filter element, the heated water, in the instance of a coffee maker, flows from the reservoir into the filter element to contact the coffee grounds and brew coffee for dispensing into a suitable receptacle. In the practice of the invention, the film of the partition, which acts as a valve, softens, stretches, weakens, breaks, shrinks, melts, dissolves or the like, to open and allow the heated water to mix and brew with the coffee grounds in the filter element.

The films of the invention can be selected from those which allow the passage of water at the desired temperature without moving with the water or otherwise affecting the chemical properties of the water. Preferred films are those which soften, stretch, weaken and break due to the hydrostatic pressure of the hot water in the water reservoir without chemically affecting the quality of the water. Various polymers may be employed as the water passing layer. The polymer films preferably lose strength and rupture when in contact with the heated water to allow water therethrough consistently under the temperature and pressure conditions within the device.

The films of the invention preferably are in the form of a relatively thin layer or layers (or ply or plies). The film can be of thicknesses ranging from monomolecular to typically about 0.005 inches (5 mils) and can be continuous or comprise filaments, threads or plies of the same or different materials. When the brewing temperatures are reached, the films of the invention respond by allowing the heated water to flow from the reservoir into the filter element without deteriorating the quality or taste of the water. The films of the invention also include heat shrinkable films, films which are plasticized by water, and multi-layer or ply films with different layers or plies selected for different functions, such as filter paper coated with a non-toxic heat responsive layer.

In a preferred embodiment of the invention, the partition includes a multi-layer film structure including an upper ply which is not affected by the heated water in the reservoir and which includes at least one aperture or opening therethrough, and a lower ply of a heat sensitive film which heat seals the partition to the container and which extends across the aperture in the upper ply. In use the heated water in the reservoir of the container causes the heat sensitive ply to soften, weaken, plasticize, melt, dissolve, break or the like to open the aperture, whereupon heated water in the reservoir flows through the aperture into the filter element and into contact with the coffee grounds for brewing and dispensing coffee from the coffee maker.

In another embodiment of the invention, the partition and filter form a packet for the coffee grounds, and wherein the packet can be placed in the container of the coffee maker. In this embodiment the container can be reused and refilled with the packets of the invention. In a preferred embodiment of the packet, the partition includes a heatsensitive film heat sealed to the filter. Upon reaching the desired brewing temperature, the heat responsive film plasticizes, thereby allowing the heated water to co-mingle with the coffee grounds in the packet for brewing coffee.

In the practice of the invention, the water can be preheated to a desired temperature of the coffee maker (e.g. from about 90° C. to 100° C.) and poured into the reservoir for brewing the coffee.

The coffee and beverage makers of the present invention also may be used in microwave ovens, by placing water in the reservoir and positioning the container on top of a cup, mug or other liquid receiving receptacle and placing the entire assembly in a microwave oven. When the water or other liquid reaches desired temperature (e.g. coffee brewing temperature) the film of the partition undergoes a change such as melting, dissolving, shrinking, plasticizing, mechanical failure, separating, developing porosity or the like, allowing the heated water to flow into and commingle with the coffee grounds in the filter element to become freshly made coffee or other beverage which can be dispensed directly into the receptacle, cup, mug or the like.

BRIEF DESCRIPTION OF THE DRAWINGS

The following drawings in which like reference characters indicate like parts are illustrative of embodiments of the invention for beverage makers and are not intended to limit the scope of the invention encompassed by the claims forming part of the application.

FIGS. 27 and 28 illustrate another embodiment for packaging of the invention and particularly the coffee maker of FIG. 11, wherein FIG. 27 is a front elevational view, partially in section, which illustrates a freshness package for the packets of FIG. 8, and wherein

DETAILED DESCRIPTION OF THE INVENTION

Referring to the drawings and first to FIGS. 1-6, there is shown a single cup, drip-type coffee maker 10 embodying the invention. It should be understood however, that other liquids may be brewed in accordance with the invention so that reference herein to "coffee" is for the sake of convenience only.

The coffee maker 10 of FIGS. 1-6 includes a container 12 in which the brewing operation takes place. The container 12 comprises three compartments, a reservoir 14 for holding water, a filter element or chamber 16 below the reservoir 14 for holding the coffee grounds and a metering element, compartment or chamber 18 below the filter element 16 for receiving and dispensing the brewed coffee. The coffee maker 10 also includes a partition 20 which separates the reservoir 14 from the filter element 16. In accordance with the present invention the partition 20 includes a film which allows passage of the water from the reservoir 14 into the filter element 16 only when the water is at or reaches coffee brewing temperatures.

The body of the container 12 can be made of a microwave permeable and safe material, such as polypropylene, polyethylene, foamed polystyrene, polycarbonate, coated paper board and the like. In the illustrative embodiment the container preferably is made from polypropylene.

The reservoir 14 of the container 12 is open at the top and includes a rim 24, a depending side wall 26 and a bottom wall 28. The rim 24 extends laterally and outwardly from the upper end of the wall 26 to facilitate pouring of the water or other liquid into the reservoir and movement of the coffee maker 10 without spilling. The wall 26 is cylindrical and is stepped and tapered inwardly and includes vertical ribs 30 for strengthening. The bottom wall 28, in the illustrative embodiment, is in the form of an annular shoulder and includes a relatively large central opening 32. As illustrated, the reservoir 14 of the invention is configured to contain the appropriate amount of water necessary to brew the desired amount of coffee and to provide the necessary hydrostatic pressure to the partition 20 to cause the partition 20 to allow the flow of water therethrough at the desired brewing temperature.

The partition 20 of FIGS. 2-6 is positioned on and heat sealed to the bottom wall 28 of the reservoir 14 and is disk like or cylindrical in shape. As illustrated, the partition 20 is multi-layered, comprising an upper layer or ply of film 34 having an aperture 36 therethrough and a lower layer or ply of heat sensitive film 38 extending across and closing the aperture 36 and heat sealed to the bottom wall 28.

The upper or top ply of film 34 prevents sticking of the other or underlying layer or layers of the film to the sealing die which can be used to seal the partition 20 within the container 12. In particular, films which have a melting point at or about the brewing temperature can stick to the sealing die. The top layer of the film 34 therefore is composed of at least one material having a melting point which exceeds the brewing temperature (e.g. from about 50° to 95° C). Examples of materials for the top layer include high density polyethylene, nylon, polypropylene, and particularly polyethylene terephthalate.

Figure 1:
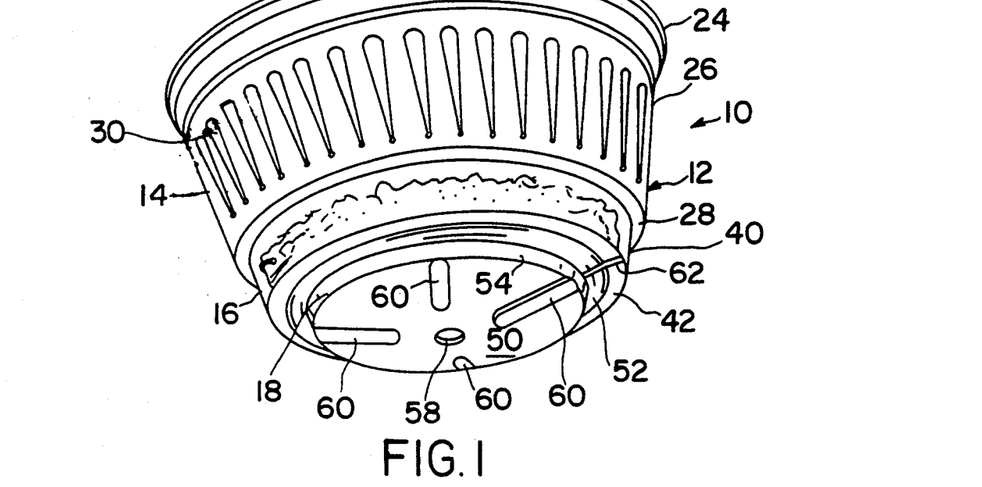
FIG. 1 is a perspective view of a preferred embodiment of the invention which can be used as a coffee maker.
Figure 2:
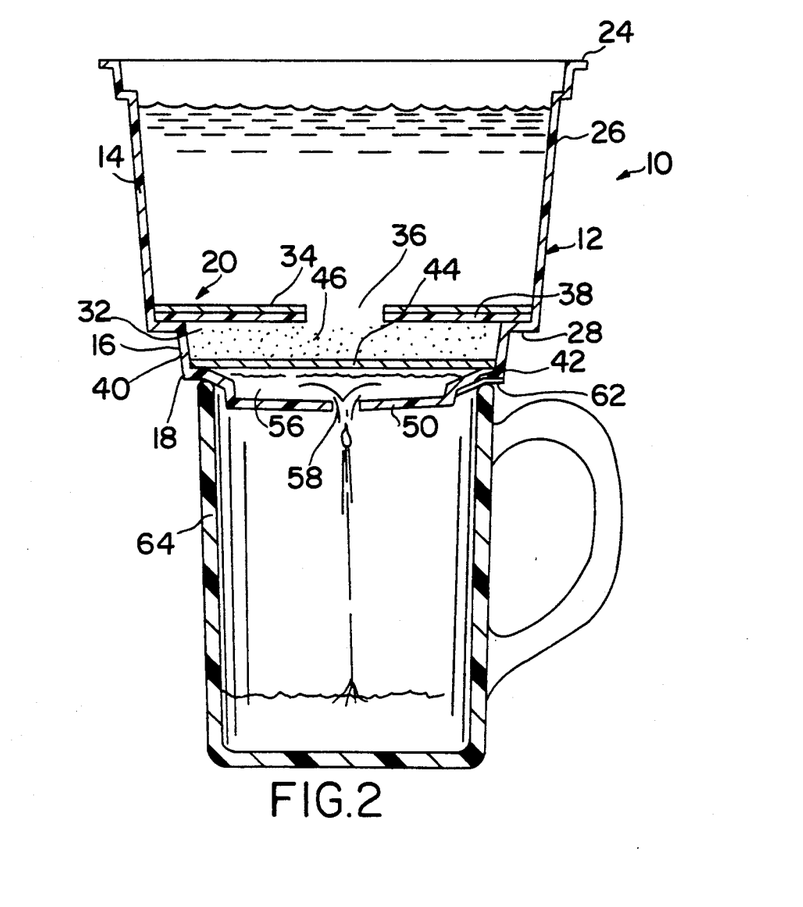
FIG. 2 is a front elevational view, in section, of the coffee maker of FIG. 1 on a mug and illustrating the operation of the invention.

When using a non-stick top layer 34, it is desirable to provide at least one slit, opening or aperture 36 through the non-stick layer to enable water to pass therethrough when the water is heated because the non-stick top layer 34 does not weaken at the brewing temperature. The top layer 34 as shown in FIG. 2 includes a single centrally positioned aperture 36. The central aperture 36 provides a pathway for the heated water, stored in the reservoir 14 to contact the underlying heat sensitive layer or layers under brewing conditions. The central aperture 36 may be replaced by multiple apertures to allow the water to contact the underlying heat sensitive layer or layers.

The lower layer or ply 38 in the preferred embodiment is thermally activated by the hot water in the reservoir 14 so that the ply softens, stretches, weakens and breaks or the like due to the hydrostatic pressure of that hot water. Examples of heat sensitive film of the invention include those comprised of an ethylene vinyl acetate or ethylene acrylic acid copolymer, low molecular weight polyolefins, natural waxes, and other thermoplastics with melting points in the range slightly below the brewing temperature e g., about 50° C. to 95° C.

Figure 3:
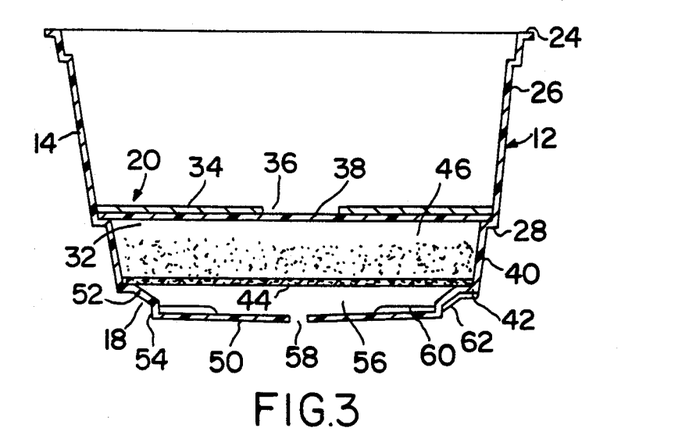
FIG. 3 is a front elevational view, in section, of the coffee maker of FIG. 1.
Figure 4:
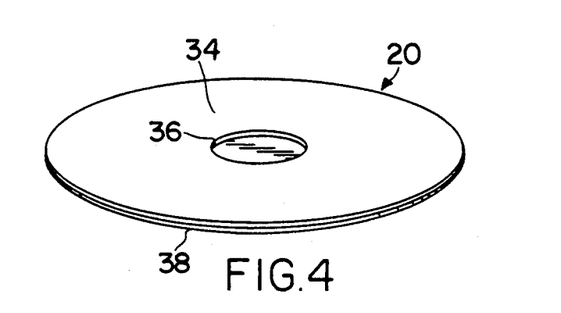
FIG. 4 is a perspective of a partition of the coffee maker of FIG. 3 including a film valve of the invention.
Figure 5:
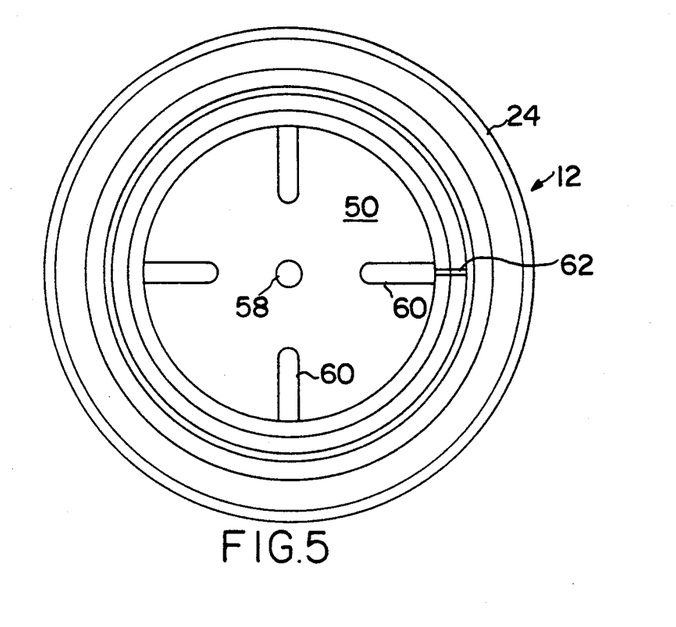
FIG. 5 is a plan view of FIG. 3 with the partition removed.

The filter element or chamber 16 includes a side wall 40 which extends downwardly from the bottom wall 28 of the reservoir 14. As shown, the filter element 16 is tubular or cylindrical with the partition 20 across its upper end supported on the bottom wall 28. Within the filter element 16 is a lower shoulder 42 for securing a filter 44 thereon and through which the brewed coffee is filtered. The filter 44 preferably is made from filter paper for coffee which is adhesively secured or heat sealed to the annular shoulder 42. The filter 44 further serves to trap or retain any portion of the thermally responsive portion of the partition 20 which has passed through the coffee grounds in the filter element 16. As illustrated in FIGS. 2 and 3, the partition 20 and filter element 16 define an area 46 with sufficient volume for holding the dry coffee grounds and for allowing the expansion of the coffee grounds during brewing without binding or compacting thereof. By so doing, the expanded coffee grounds do not inhibit the flow of water therethrough.

The coffee receiving and dispensing compartment 18 includes a generally cylindrical side wall 48 depending from the bottom wall or shoulder 42 of the filter element 16, and a bottom wall 50 from which the coffee is dispersed. The side wall 48 includes an upper inwardly sloping portion 52 to facilitate the flow of brewed coffee and a tubular or cylindrical wall 54 depending from the sloping portion 52. The bottom wall 50 extends across the compartment 18 and forms with the side wall 48, an area 56 for receiving brewed coffee from the filter element 16. The bottom wall 50 is sloped downwardly to direct the flow of brewed coffee from the compartment 18 and includes a centrally positioned restrictive aperture 58 from which the brewed coffee is dispensed. The aperture 58 is sized to ensure total wetting of the coffee grounds.

The bottom wall 50 also includes equi-spaced inwardly extending ribs 60 to limit the downward movement of the filter 44 and thereby maintain the area 56 for receiving of brewed coffee.

Figure 6:
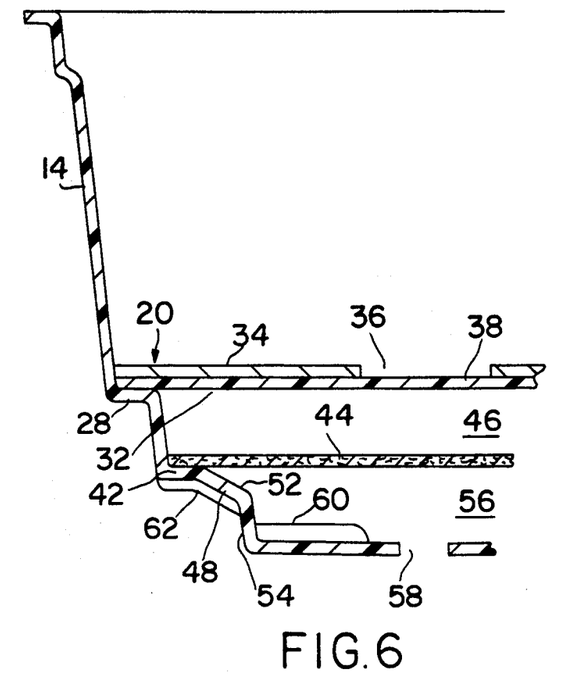
FIG. 6 is an enlarged detail and a partial sectional view of the coffee maker of FIG. 3.

The coffee maker 10 of FIGS. 1-6 also includes means for positioning or resting the coffee maker 10 above or on receptacle 64 such as a mug. As shown in FIG. 2 and 6, the coffee maker 10 includes a bottom wall 42 of the filter element 16 which has a greater breadth than the breadth of the mug 64 and which can rest on the mug 64 while the compartment 18 extends into the mug 64. To prevent vapor lock between the coffee maker 10 and the receptacle 64, an outwardly extending radially rib 62 is provided. The rib 62 is provided on the bottom wall 42 between the side walls 40 and 48. In use the rib 62 always maintains a space between the mug 64 and the coffee maker 10 as shown in FIG. 2 and thereby prevents the coffee maker 10 and mug 64 from sealing or sticking together due to vapor lock.

In manufacture, the coffee container 12 can be formed by conventional techniques, such as molding or thermoforming. In the illustrative embodiment of FIGS. 1-6 the container 12 is thermoformed from polypropylene. In the illustrative embodiment of FIGS. 1-6, the coffee maker 10 includes a container 12 having an overall height of about 2½ inches. The reservoir 14 has a height of about 1½ inches and an average breadth or diameter of about 4 inches for holding about 9 ounces of water. The filter element 16 has a height of about ½ inch and breadth or diameter of 3½ inches and the receiving and dispensing compartment 18 has a height of about ¼ inch and a breadth of 2½ inches. The ribs 60, typically can extend inwardly about ¾ inches from the bottom wall 50 and the rib 62, typically is raised about 1/16 inch. The aperture 58 has a breadth or diameter of about 1/10 inch.

The partition 20 of the described illustrative embodiment has a diameter of about 3¾ inches and includes an upper layer 34 preferably made from polyethylene terephthalate and an aperture 36 having a diameter of about 1 inch. The thickness of the upper layer 34 typically is from about ¼ to about 2 mils. The lower layer 38 is formed from a predominant amount of ethylene vinyl acetate copolymer sold under the designation DAF No. 801 by The Dow Chemical Company. The lower layer 38 typically has a thickness of about ½ to about 2 mils.

In assembling the components of the coffee maker 10, the filter 44 having a breadth or diameter of 3½ inches, is heat sealed to the bottom wall 42 by a conventional heat sealing die and a premeasured amount of coffee, e.g. about 14 grams for the illustrative coffee maker 10, is added to the filter element 16.

Thereafter, the partition 20 of the films 34 and 38 is placed on the bottom wall 28 with the film 38 in contact therewith and heat sealed to the wall 28 by a conventional heat sealing die (not shown). The die comes into contact with the film 34 and through transmission of heat seals the film 38 to the bottom wall 28.

The coffee grounds for the filter elements may be in any suitable form, preferably in a fine grind.

Figure 7:
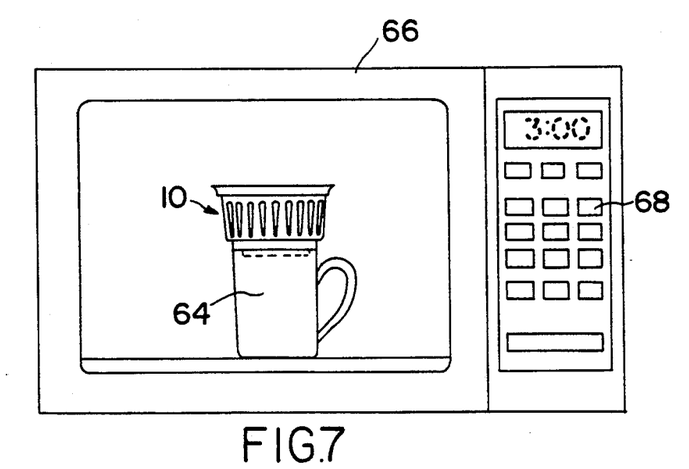
FIG. 7 is the coffee maker and mug of FIG. 2 in a microwave oven wherein the water in the reservoir can be heated to a brewing temperature.

In using the illustrative coffee maker 10 to brew a cup of fresh drip-type coffee in a microwave oven 66 as shown in FIG. 7, the reservoir 14 is filled with water, the filled coffee maker 10 is positioned on a cup 64 or the like, and the assembly is placed in the microwave oven 66. The microwave oven 66 is set for a predetermined time by activating the appropriate button on the control panel 68. It has been found that in a 700 watt microwave oven, one mug (9 ozs.) of tap water will reach 90° C. in about three minutes. As the water reaches the brewing temperature, e.g. 90° C., the exposed portion of the heat responsive film 38 softens and breaks to open the aperture 36, whereupon the heated water flows out of the reservoir 14 through the aperture 36 and into the coffee grounds stored in the area 46 of the filter element 16. There the heated water commingles with the coffee grounds to produce freshly brewed coffee which flows into the compartment 18 and dispensed therefrom through aperture 58.

In the preferred embodiment of FIGS. 1-6, the weakened portion of film 38 does not pass into the filter element 16 because the preferred films retain their integrity while allowing water to pass therethrough. However, any portions of the film which does pass into the filter element 16 is retained either in the coffee grounds or by the filter 44 so that it does not enter the receptacle 64. During this stage of the process, the microwave oven 66 may be turned off and the freshly brewed coffee allowed to continue to flow though the filter 44 and into the receptacle 64 below. The dripping process takes about two minutes. At this point, the assembly is removed from the microwave oven 66, and the coffee maker 10 removed from the receptacle 64, leaving a cup of the coffee ready for drinking. In removal, the coffee maker 10 can be tilted to inhibit the dripping of any remaining brewed coffee from the compartment 18 through the restricted aperture 58.

Alternatively, the coffee maker 10 can be placed on a receptacle, such as a receptacle 64, and heated water (e.g. about 90° C. to about 100° C.) can be added to the reservoir 14, whereupon the heated water acts on the exposed portion of the film 38 to allow heated water to flow into the filter element 16 and freshly brewed coffee is produced and dispensed as previously described.

Figure 8:
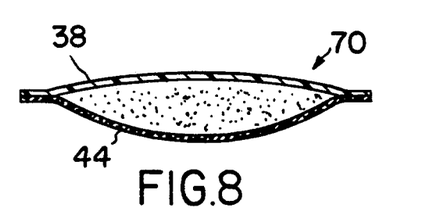
FIG. 8 is a front elevational view, in section, of a film partition and filter in the form of a packet with coffee grounds there between for a coffee maker of the invention.
Figure 9:
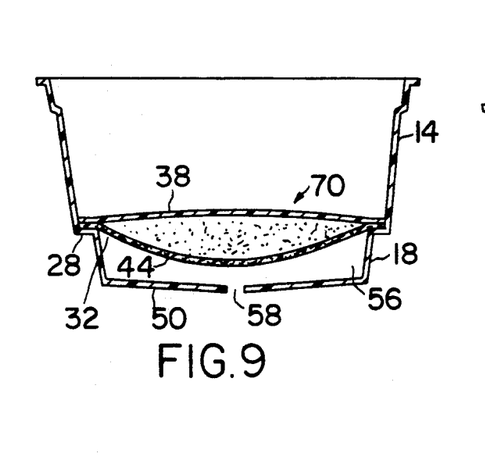
FIG. 9 is a front elevational view, in section, of a coffee maker of the invention including the packet of FIG. 8.
Figure 10:
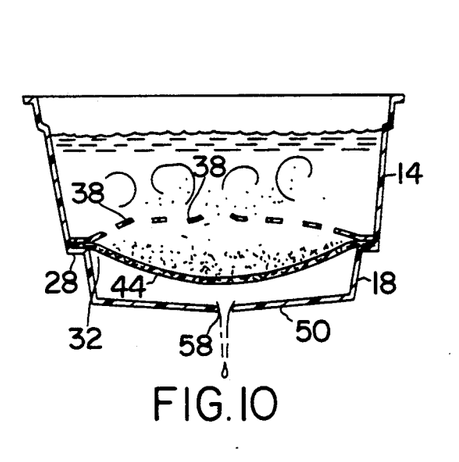
FIG. 10 illustrates the coffee maker of FIG. 9 in operation.

Referring now to FIGS. 8-10, there is shown another embodiment of the invention, including a partition 38 and filter 44 with coffee therebetween, to thereby form a packet 70 of coffee.

In this embodiment, the packet 70 is formed from a single layer of heat sensitive film 38 and a heat sealable filter paper 44, wherein the film 38 and filter paper 44 are heat sealed together about their perimeters with the desired amount of coffee therebetween. In turn, the coffee filter 44 of the packet 70 is heat sealed to the bottom wall 28 of the reservoir 14 as shown in FIG. 9.

Preferably the film 38 is plasticizable in water heated to coffee brewing temperatures. Examples of water plasticizing polymers include ethylene vinyl alcohol copolymer, cellophane, polyacrylamide, polyacrylates, polyvinyl alcohols, polyvinyl pyrrolidone, rice paper, or other films that plasticize with water or fragment in water in the desired temperature range. A preferred example of the film for use in the formation of the partition is a copolymer of ethylene and vinyl alcohol with an ethylene content of up to about 40 mol%, most preferably in the range of from about 29 to 32 mol%.

As illustrated in FIG. 10 water or other liquid of the desired brewing temperature causes the film 38 to fragment or open, allowing the heated water or other liquid to flow into and commingle and brew with the coffee grounds or other foodstuff. The brewed liquid, e.g. coffee, then flows through the filter 44 into the compartment 18 and from which the brewed liquid is dispensed through aperture 58.

The packet 70 of the invention can be formed by using a form, fill and seal pouch machine. In forming the packets 70, a pouch is formed in the filter 44, the pouch is filled with coffee grounds or the like and then the film 38 is placed over and heat sealed about its perimeter to the perimeter of the filter 44 is thereby formed. The packet 70 can then be heat sealed to the bottom wall 28 of the reservoir 14.

Figure 11:
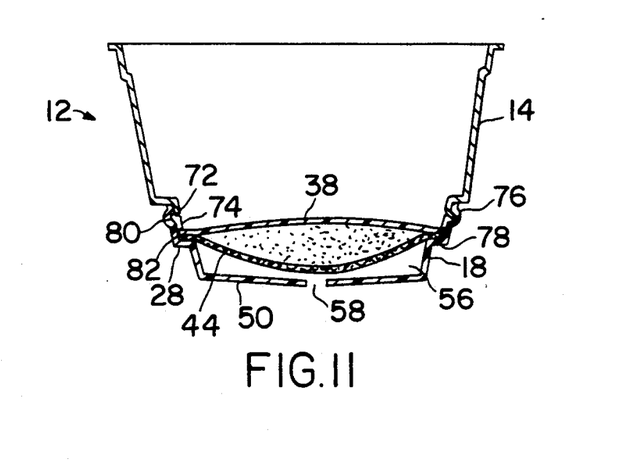
FIG. 11 is a front elevational view, in section, of another embodiment of the coffee maker of the invention including the packet of FIG. 8.

In another embodiment of the invention, and as shown in FIG. 11, the described packets 70 can be inserted into a reusable container 12 and be used as part of a refill system. In this illustrative embodiment, a reservoir 14 having an outer annular bead or engaging member 72 about a lower portion 74 thereof and a separate compartment 18 having an upper annular end 76 including an annular shoulder 78 and an annular groove 80 therein snap together to receive the components to one another. In use a packet 70 is placed on the annular shoulder 78 of the compartment 18 and the lower portion 74 of the reservoir 14 is inserted in the upper end of the compartment 18 until its lower end 82 abuts the film 38 of the packet 70, whereupon the components are snapped together to secure the packet 70 within the assembled beverage maker ready for use as previously described.

In this embodiment, the container 12 can be reused with single use packets 70 and thereby provide a refill system of the present invention.

Figure 12:
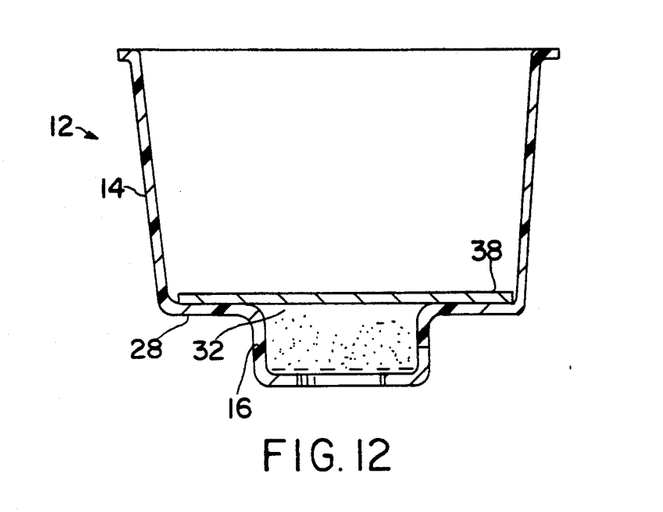
FIG. 12 is a front elevational view, in section, of a coffee maker of the invention, wherein the partition is in the form of a film which extends entirely across the reservoir.

In FIG. 12, there is shown a coffee maker 10, wherein the partition 20 is a single ply of film 38 attached to the shoulder 28 of the reservoir 14 and stretched across the entire inner diameter of the opening 32 separating the reservoir 14 from the filter element 16.

The film 38 can be constructed so that upon heating the film shrinks causing at least one opening to form. In particular, the film 38 may be provided with at least one area of stress which gives way to an opening when the film begins to shrink. Referring to FIGS. 13A-16B each of the embodiments of the film 38 is made from a heat shrinkable material, such as, for polyethylene, polypropylene, polyester, vinylidene chloride based copolymers, or other thermoplastic film fabricated with frozen in stress.

Figure 13A:
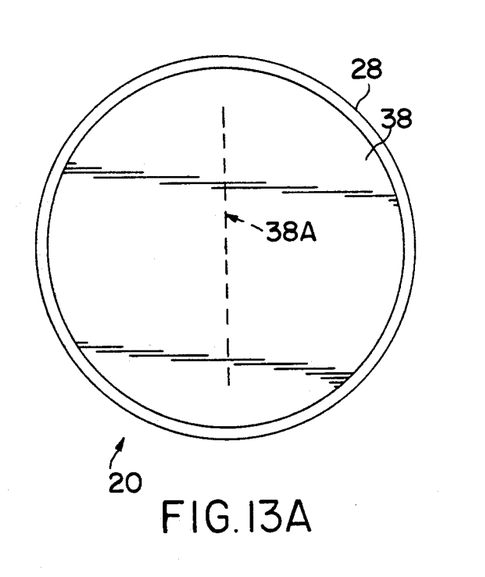
FIG. 13A is a plan view of FIG. 12, showing the film with a discontinuous line of weakness.
Figure 13B:
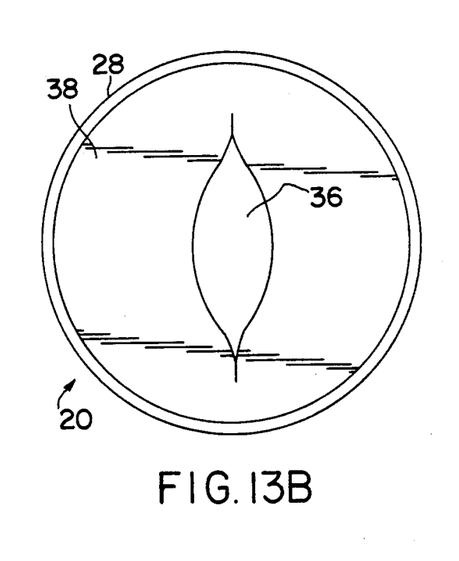
FIG. 13B is a plan view similar to FIG. 13A illustrating the parting of the film when the water in the reservoir reaches a brewing temperature.

More specifically, FIG. 13A illustrates a shrink film 38 extended across the shoulder 28 the reservoir 14 similar to the construction shown in FIG. 12. This shrink film 38 is thermally responsive and separates when the water in the reservoir 14 reaches the coffee brewing temperature. In this embodiment, the film 38 forming the partition 20 may have a line of weakness 38A, which may be continuous or discontinuous. The line of weakness can be either inherent in the film itself, strategically placed there, or both. When the water in the reservoir 14 reaches the brewing temperature, the film 38 separates along the line of weakness 38A forming the opening 36 as illustrated in 13B.

Figure 14A:
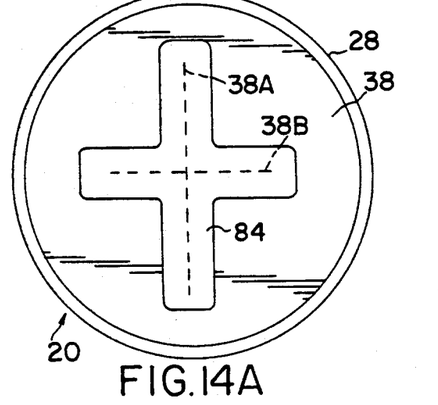
FIG. 14A is a plan view similar to FIG. 13A, illustrating a film having two discontinuous lines of weakness which cross one another.
Figure 14B:
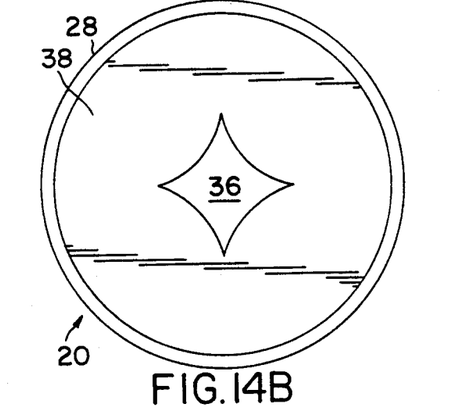
FIG. 14B is a plan view of the film shown in FIG. 14A, after the water in the reservoir reaches a brewing temperature.

FIG. 14A illustrates a shrink film 38 forming the partition 20 having two lines of weakness 38A and 38B which cross one another. A releasable tape 84 can be placed over the lines of weakness 38A and 38B to protect them prior to use. Before water is placed in the reservoir 14, the tape 84 is removed. When the water remains at ambient temperatures, the partition retains the water in the reservoir 14. However, as the water is heated, the lines of weakness 38A and 38B weaken until, when the brewing temperature is reached, the film 38 separates along the lines of weakness as shown in FIG. 14B, which allows the heated water to pass through the aperture 36 of the partition 20 into the filter element 16.

Figure 15A:
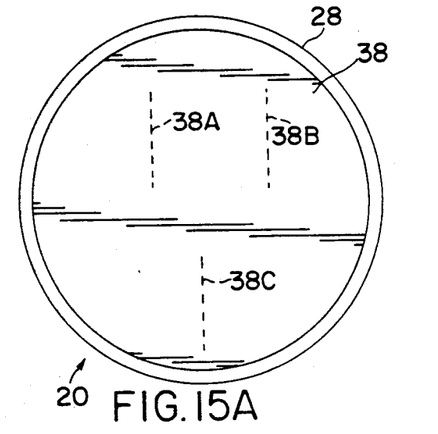
FIG. 15A is a plan view similar to FIG. 13A showing the film with multiple lines of weakness to separate and pull apart thus forming multiple apertures.
Figure 15B:
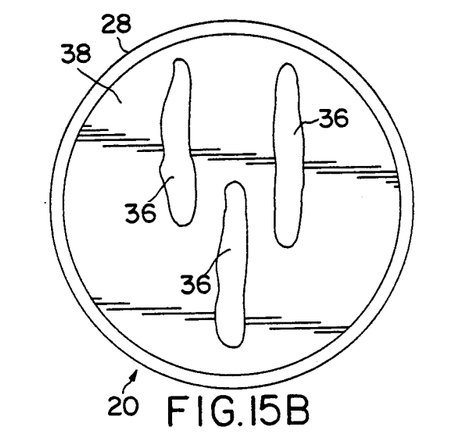
FIG. 15B is a plan view showing the film of FIG. 15A, when the water in the reservoir reaches a brewing temperature.

Another embodiment of the partition 20 utilizing a shrink film is illustrated by FIGS. 15A and 15B. The film 38 is sealed to the bottom wall 28 of the reservoir 14 under tension. When the water temperatures reaches the brewing temperature, the film 38 separates and pulls apart forming a plurality of apertures 36 as shown in FIG. 15B, thereby allowing the water to pass from the reservoir 14 into the chamber 46 of the filter element 16. The film 38 in this embodiment may be provided with lines of weakness as indicated by 38A, 38B and 38C.

Figure 16A:
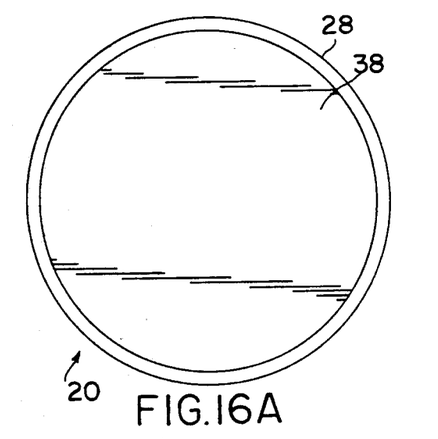
FIG. 16A is a plan view of a heat shrinkable film.
Figure 16B:
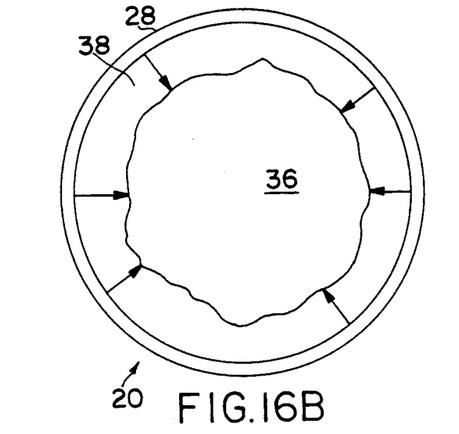
FIG. 16B is a plan view of the film of FIG. 16A shown pulled away from its attachment to the container along its circumference when the water reaches a brewing temperature.

A further embodiment of the partition 20 includes a shrinkable film 38 attached at its periphery to either the reservoir 14 or the filter element 16. This is shown in FIG. 16A. When the water temperature is elevated to the brewing temperature, which also is the thermal responsive range of the shrink film, the film 38 pulls away from the side wall 28 as indicated by the arrows and toward the center of the container 12. This allows the heated water to pass into the chamber 46 of the filter element 16 through an opening 36 around all or a portion of the periphery of the film 38 as shown in FIG. 16B.

Figure 17A:
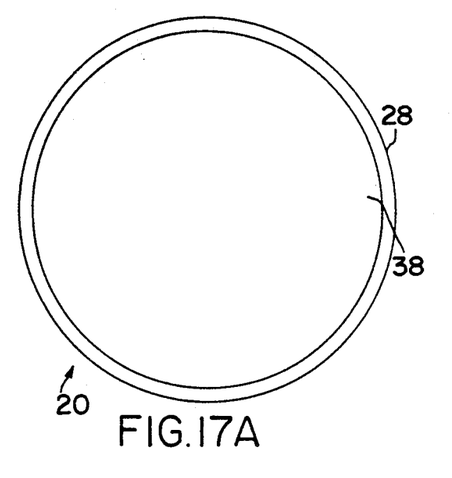
FIG. 17A is a plan view of non-porous film employed in the invention under ambient conditions.
Figure 17B:
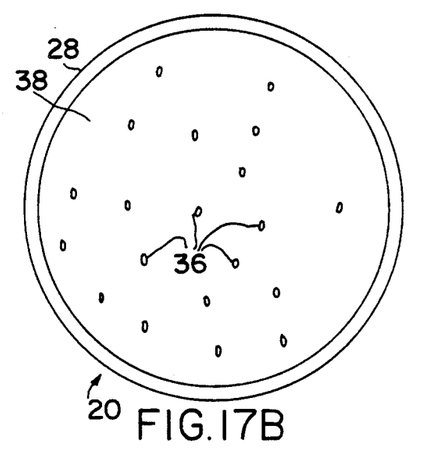
FIG. 17B is a plan view of the underside of the film shown in FIG. 17A wherein the pores of the film have been opened when the water reaches a brewing temperature.

FIGS. 17A and 17B illustrate another embodiment of the coffee maker 10. In this embodiment, the partition 20 includes a non-porous film 38 which becomes porous at the brewing temperature. Prior to heating, the film prevents water from passing out of the reservoir 14 and into the filter element 16. When this embodiment of the coffee maker 10 is heated in a microwave oven 66 and the water reaches the brewing temperature, or preheated water is used, the film 38 becomes porous allowing the water to pass through small pores 36. Examples of such materials include a tightly woven cloth of thermoplastic fiber, needle point carded fabric of thermoplastic fiber, and microporous film structures of various composition.

Figure 18A:
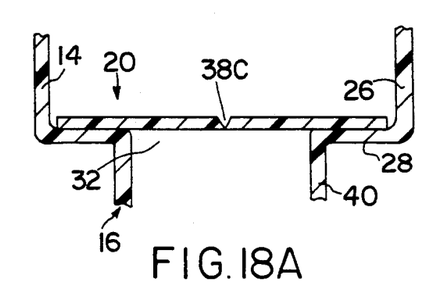
FIG. 18A is partial sectional view of another embodiment of the film which has been scored to provide a continuous line of weakness.
Figure 18B:
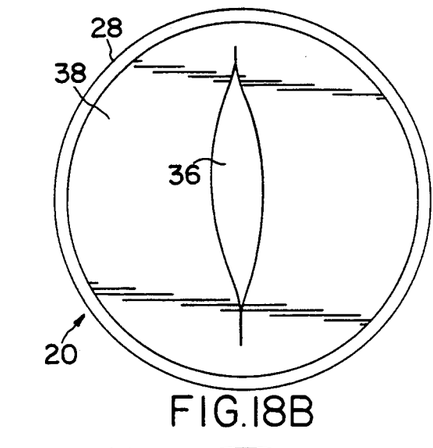
FIG. 18B is a plan view of the film of FIG. 18A, wherein the score line has opened in response to the water reaching a brewing temperature.

FIG. 18A illustrates a further embodiment of the invention, showing the film 38 with a continuous or discontinuous score line 38C strategically placed in the film 38. As shown in FIG. 18B, when the water in the reservoir 14 reaches the brewing temperature, the film 38 ruptures along the score line 38C, thus allowing the heated water to pass into the filter element 116.

Figure 19A:
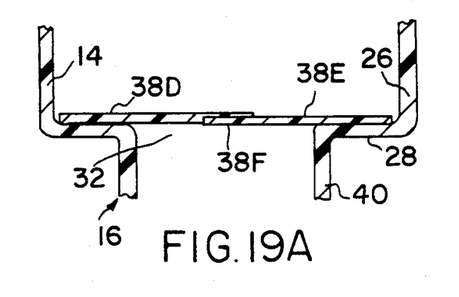
FIG. 19A is a partial sectional view of another embodiment of the film which includes two overlapping sections releasably secured to one another.
Figure 19B:
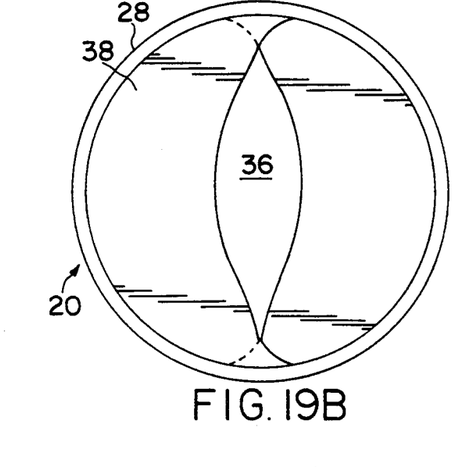
FIG. 19B is a plan view of the film of FIG. 19A wherein the overlapping sections have separated when the water reaches a brewing temperature.

In another embodiment employing a shrink film as shown in FIG. 19A, two or more sections of film 38D and 38E are overlapped either on the bottom of the reservoir 14 or at the top of the filter element 16 to form an overlapped section identified by numeral 38F. When the water temperature reaches the brewing temperature, the sections 38D and 38E of the film 38 pull away from one another undermining the integrity of the water tight seal of the overlapped section 38F. The film 38 is thus opened and water flows through the resulting aperture 36 from the reservoir 14 into the filter element 16. The overlapped section 38F can vary in size as long as the seal formed by sections 38D and 38E remains watertight until the water reaches the brewing temperature and separates as shown in FIG. 19B.

Figure 20A:
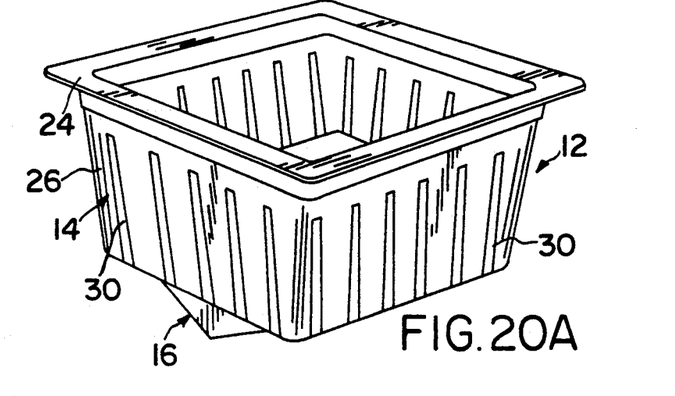
FIG. 20A is a perspective view of another embodiment of a coffee maker of the present invention.
Figure 20B:
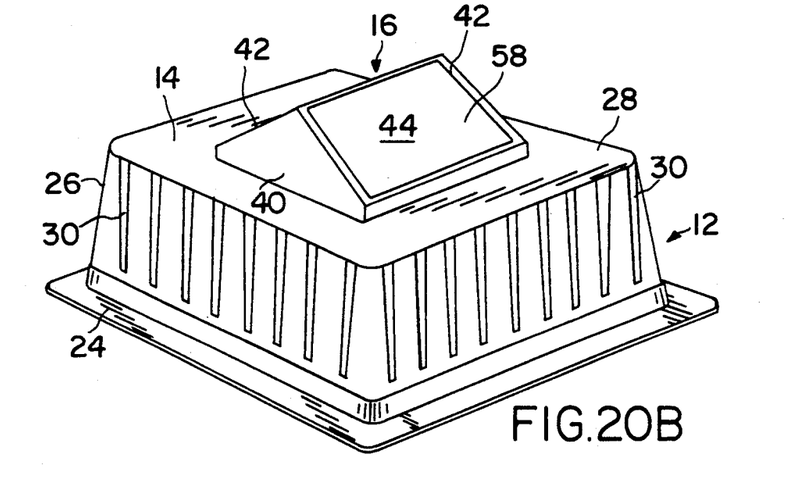
FIG. 20B is a bottom perspective view of the coffee maker of FIG. 20A.
Figure 20C:
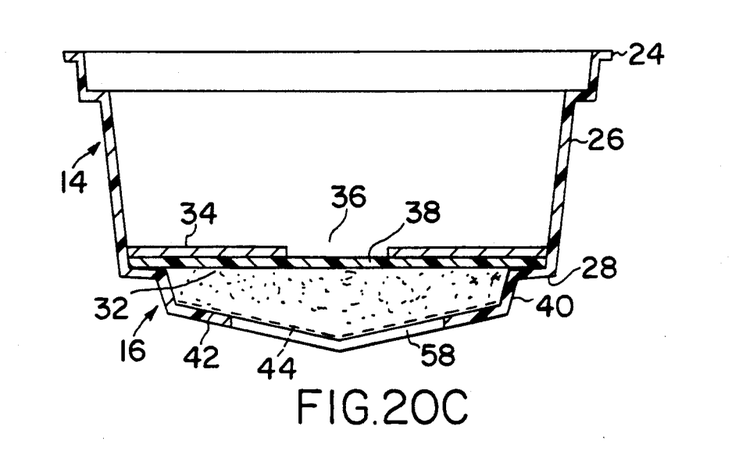
FIG. 20C is a front elevational view, in section, of the coffee maker shown is FIG. 20A.

Referring now to FIGS. 20A-20C, there is illustrated another embodiment of the coffee or beverage maker of the present invention having a reservoir 14 with a generally rectilinear cross-sectional shape. Specifically, in the illustrative embodiment, the reservoir 14 has a square shape, and includes a rim 24 extending laterally from and about the upper end of the reservoir walls 26 to facilitate pouring of water and movement of the coffee maker 10 without spilling. The reservoir 14 preferably includes vertical ribs 30 for strengthening the walls 26.

The partition 20 for this embodiment of the invention can be of a variety of configurations of the type previously described and in this embodiment has a square shape. As shown in the illustrative embodiment of FIG. 20C, the partition 20 is heat sealed to the bottom wall 28 of the reservoir 14 over the opening 32, and includes a non-toxic heat responsive film 38 such as ethylene vinyl acetate copolymer laminated to a non-stick top layer 34 as preferably illustrated in FIG. 3.

In the illustrative embodiment of FIGS. 20A-20C, the filter element 16 also includes side walls 40 having a substantially rectilinear cross-sectional shape and a depending sloping bottom wall 42 to form a generally cone-shaped filter element 16 having its vertex in the center thereof as shown in FIG. 20B. As shown in FIG. 20C a filter 44 is positioned along the cone-shaped bottom wall 42 and is supported thereby. The filter element 16 with the sloping walls 42 enhance the hydraulic dynamics of the water flowing through the filter element 16.

Figures 21, 21A:
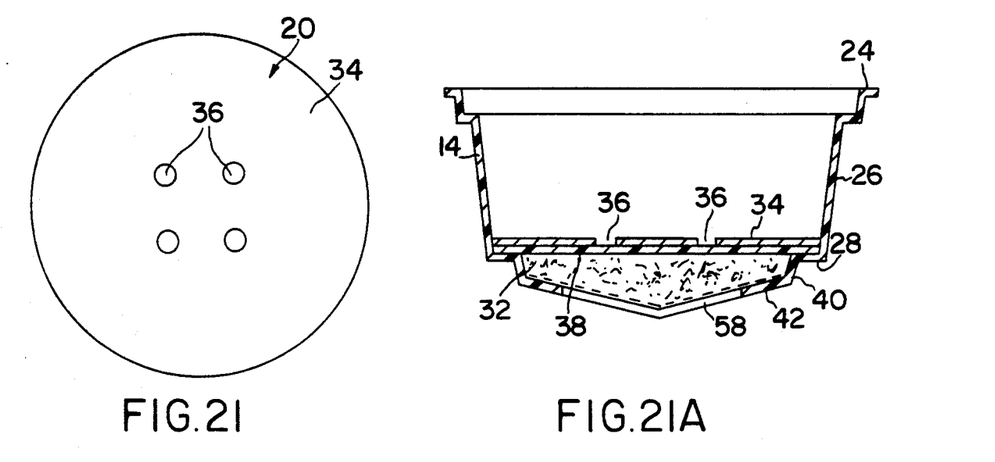
FIG. 21 is a plan view of a film partition of the present invention, wherein the partition includes a plurality of apertures.
FIG. 21A is a front elevational view, in section, of a coffee maker similar to FIGS. 20A-20C, wherein the partition of FIG. 21 is utilized.

In FIGS. 20A-20C the illustrative partition 20 includes a single aperture 36, whereas in the illustrate embodiment shown in FIGS. 21A and 21B, the partition 20 includes a plurality of apertures 36 (e.g., four apertures), each of which has a smaller breadth or diameter than the single aperture 36 of FIG. 20C.

In several previously described embodiments of the invention the reservoir 14 and the filter element 16 were shown formed integral with each other. In the embodiments now described, the reservoir 14 is formed separate from the filter element 16.

Figure 22:
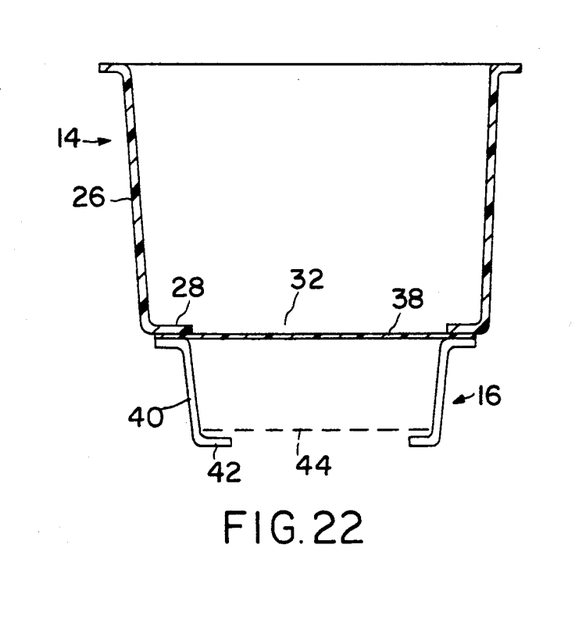
FIG. 22 is a front elevational view, in section, of still another embodiment of the coffee maker, wherein the assembly is in two separate parts having a partition therebetween.

Referring now to FIG. 22, the illustrated coffee maker 10 includes a first part comprising reservoir 14 and a second part including the filter element 16 with the partition 20 separating the component parts of the container 12. The film partition 20 includes the film 38 positioned between the reservoir 14 and the filter element 16. When the reservoir 14 and the filter element 16 are joined, the film 38 is sealed therebetween to form the coffee maker 10 of the invention. Optionally, the film 38 can first be joined to the reservoir 14, or first joined to the filter element 16 before the remaining part of the coffee maker 10 is joined. The joining process can be by means of cold or hot sealing, with or without additional adhesives, depending upon the sealing characteristics of the film 38 therebetween.

Figure 23:
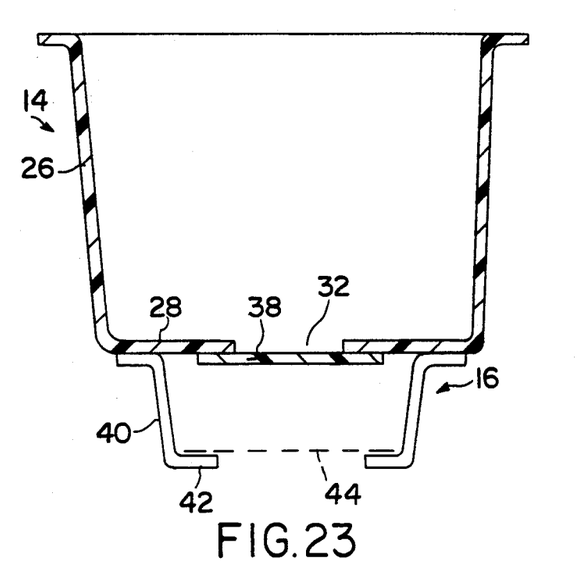
FIG. 23 is a front elevational view, in section, of another embodiment of the coffee maker in two parts.

Another embodiment of the invention wherein the reservoir 14 and the filter element 16 are constructed separately is shown in FIG. 23. In this embodiment the bottom wall 28 of the reservoir 14 extends inwardly to form a central opening or aperture 36. The partition 20 includes a film 38 which covers the aperture 36 and is sealed to the bottom wall 28. The film 38 is shown sealed to the underside of the bottom wall 28 but may also be sealed on the topside of the bottom wall 28 as well.

In operation, when the water in the reservoir reaches the brewing temperature, the film 38 opens the aperture 36. In this embodiment, moreover, the filter element 16 can be independent and not integrally formed with the reservoir 14. The illustrated filter element 16 can be separately formed and heat sealed or otherwise secured to the top or bottom sides of the bottom wall 28 of the reservoir 14.

Figure 24:
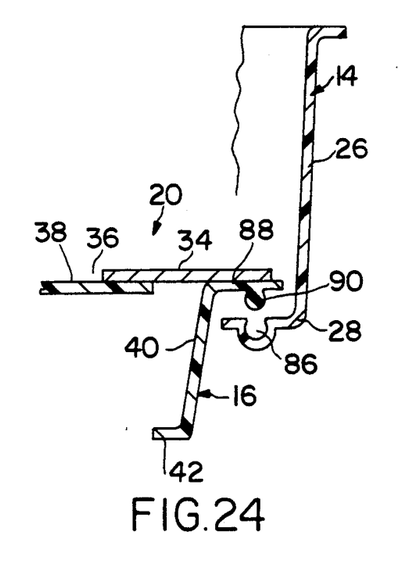
FIG. 24 is a partial sectional view of another embodiment of the coffee maker, wherein the filter element snaps into the lower portion of the reservoir.
Figure 25:
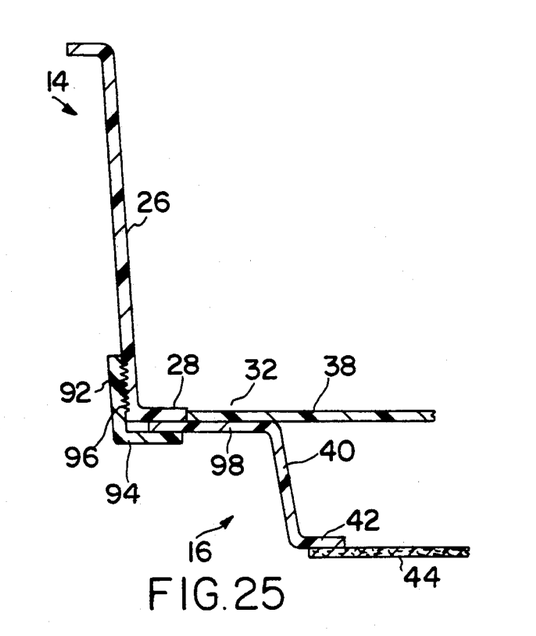
FIG. 25 is a partial sectional view of another embodiment of the coffee maker, wherein the coffee filter element is secured to the lower portion of the reservoir by means of a compression ring.

The coffee maker of the present invention may be provided with a filter element 16 and reservoir 14 as separate components which can be releasably engaged when coffee is to be brewed. Referring to FIGS. 24-25 there is shown coffee makers 10 which include reservoirs 14 separate from the filter elements 16.

In FIG. 24, the bottom wall 28 of the reservoir 14 is provided with a groove 86 and the rim 88 of the filter element 16 is provided with a corresponding detent 90. When the detent 90 is snapped into the groove 84, the reservoir 14 releasably engages the filter element 16.

Figure 26:
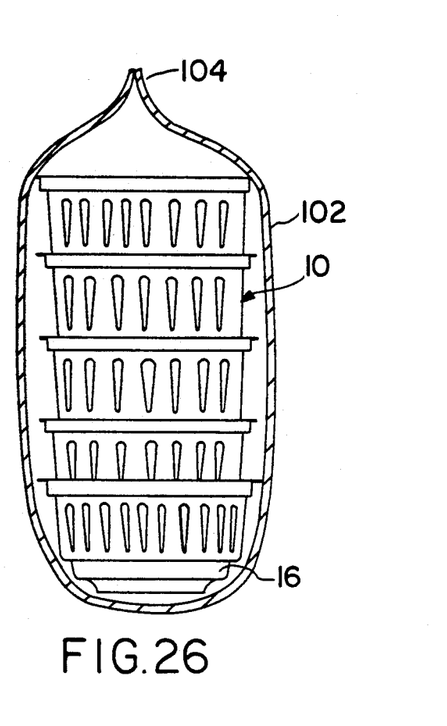
FIG. 26 is a front elevational view, in partial section, of a package for storing the coffee makers of the present invention, wherein pre-measured amounts of coffee are in the sealed filter elements such as shown in FIG. 1.

FIG. 25 shows an embodiment of the invention in which a compression ring is used to secure the reservoir 14 to the filter element 16. Specifically, the side wall 26 is provided with threads 92 on the lower outer surface thereof. The threads 92 are adapted to engage a compression ring 94 having corresponding threads 96. The rim 98 of the filter element 16 is securely held against the underside of the bottom wall 28 of the reservoir 14 by the engagement of the threads 92 with of the compression ring 94. The compression ring 94 encompasses the entire periphery of both the reservoir 14 and the filter element 16 and thereby draws the rim 98 into sealing contact with the bottom wall 28 to form a liquid impervious seal between the reservoir 14 and the filter element 16. As shown in FIG. 26, the film 38 is squeezed between the reservoir 14 and filter element 16 to enhance the integrity of the seal.

While a single cup coffee maker is shown in the illustrative embodiments, it is to be understood that a larger coffee or beverage maker with a correspondingly larger receptacle may be employed for multi-cup brewing or the like. The embodiments of the invention specifically illustrated herein can be adapted to provide more than one serving of freshly brewed coffee or other liquid in the receptacle from which individual servings of coffee or beverage can be poured.

The freshness of the coffee grounds or food stuffs in assembled beverage makers 10 or separable filter elements 16 can be preserved by housing the components in airtight nitrogen-purged containers or bags, or the like. FIG. 26 illustrates an embodiment of a freshness container or bag 102 for packaging beverage makers 10. The beverage makers contain premeasured amounts of coffee grounds in the filter element 16 which are nested and the bag 102 is sealed at 104 by a suitable heat sealing adhesive or the like until a beverage maker 10 is needed.

Figure 27:
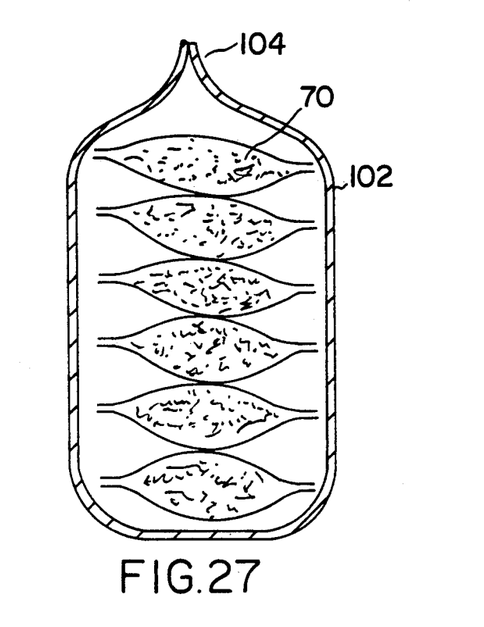
Figure 28:
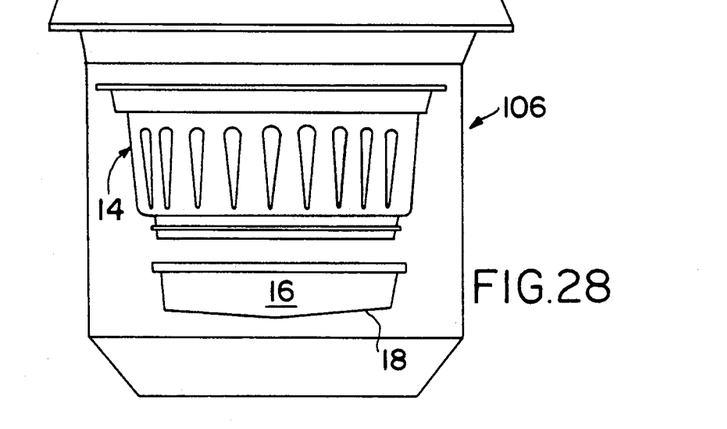
FIG. 28 is a side elevational view of a box for the other components of the coffee maker.

FIGS. 27 and 28 are illustrative of a freshness package 102 for the packets 70 of FIG. 8 and of a package or box 106 for the other components of the beverage maker 10 of FIG. 11.

As stated previously, the beverage makers 10 of the invention can be used to brew coffee as well as other liquids, such as soup, broth, tea, flavored drinks and the like, and the beverage makers of the invention can include different containers and partitions as demonstrated in the illustrative embodiments of the invention.

Thus, the invention in its broader aspects is not limited to the specific described embodiment and departures may be made therefrom with the scope of the accompanying claims without departing from the principles of the invention and without sacrificing its chief advantages.

What is claimed is:

1. A beverage maker for use in a microwave device adapted to dispense a freshly brewed beverage, comprising:
    a reservoir for holding heated liquid or liquid to be heated to a temperature for brewing a beverage,
    a filter element adapted to hold a substance for brewing the beverage and to receive the heated liquid from said reservoir and dispense a freshly brewed beverage therefrom,
    a partition between said reservoir and filter element, including a film adapted to close and seal communication between said reservoir and filter element until liquid in said reservoir is at a temperature for brewing the beverage, whereupon said film is adapted to be melted to provide at last one opening in said film for providing a communication between said reservoir and said filter element and allow the heated liquid to contact the substance and become a freshly brewed beverage, and
    a chamber adapted to receive the brewed beverage for said reservoir and to dispense the brewed beverage from the beverage maker.

2. The coffee maker of claim 1 adapted to dispense the freshly brewed coffee into a receptacle therebelow while in the microwave oven.

3. The beverage maker of claim 1, wherein said film stretches and ruptures from the hydrostatic pressure of the water in the said reservoir in the temperature range of about 50° C. to about 100° C.

4. The beverage maker of claim 1, wherein said film is selected from the group consisting of ethylene vinyl acetate copolymer, ethylene acrylic acid copolymer, polyolefin, ethylene vinyl alcohol copolymer and rice paper.

5. The beverage maker of claim 1, wherein said film comprises ethylene vinyl acetate copolymer.

6. The beverage maker of claim 1, wherein said film shrinks.

7. The beverage maker of claim 6, wherein said shrink film comprises a thermoplastic polymer film fabricated with frozen-in stress.

8. The beverage maker of claim 6, wherein said shrink film is selected from the group consisting of polyethylene, polypropylene, polyester or vinylidene chloride based copolymers.

9. The beverage make of claim 1, wherein said film plasticizes with water or fragments in water in the temperature range of about 50° C. to about 100° C.

10. A beverage maker adapted to dispense a freshly brewed beverage, comprising:
 a reservoir for holding heated liquid or liquid to be heated to a temperature for brewing a beverage,
 a filter element adapted to hold a substance for brewing the beverage and to receive the heated liquid from said reservoir and dispense a freshly brewed beverage therefrom, and
 a partition between said reservoir and filter element, including a film adapted to close and seal communication between said reservoir and filter element until liquid in said reservoir is at a temperature for brewing the beverage, whereupon said film is adapted to be melted to provide at last one opening in said film for providing a communication between said reservoir and said filter element and allow the heated liquid to contact the substance and become a freshly brewed beverage ready for dispensing from the beverage maker; and wherein said partition comprises:
 an upper layer of film in contact with and impervious to the heated liquid in said reservoir, wherein said upper layer has an aperture therethrough, and
 a layer of film underlying said upper film layer for heat sealing said partition within said container between said reservoir and said filter element, wherein said underlying film layer also extends across said aperture until liquid in said reservoir is at a brewing temperature, whereupon said underlying film layer opens to allow said liquid to flow through said aperture into said element for brewing a beverage.

11. The beverage maker of claim 10, wherein said upper layer of film is selected from at least one member of the group consisting of high density polyethylene, nylon and polyethylene terephthalate.

12. The beverage maker of claim 10, wherein said underlying layer of film is selected from at least one member of the group consisting of ethylene vinyl acetate copolymer, ethylene acrylic acid copolymer, low molecular weight polyolefins and natural waxes.

13. The beverage maker of claim 10, wherein said partition includes an upper layer of film comprising polyethylene teraphthalate and a underlying layer of film comprising ethylene vinyl acetate copolymer.

14. A drip-type coffee maker adapted to discharge freshly brewed coffee, comprising:
 a reservoir for holding water to be heated to a temperature for brewing coffee,
 a coffee filter element adapted to hold coffee grounds and to receive the heated water from said reservoir and dispense freshly brewed coffee therefrom, and
 a partition between said reservoir and coffee filter element, including a film comprising a layer of a copolymer of ethylene and vinyl alcohol with an ethylene content of up to about 40 mol%, said film being adapted to be sealed to close communication between said reservoir and coffee filter element until water in said reservoir is heated to a temperature for brewing coffee, whereupon said film is adapted to be melted to provide at least one opening on said film to allow passage of the heated water into said filter element.

15. The drip-type coffee maker of claim 14, wherein said film further comprises an adhesive layer adapted to adhere said copolymer layer to said reservoir.

16. The drip-type coffee element of claim 15, wherein said adhesive layer is the seal and contains a polymer adapted to permit the passage of water therethrough at a brewing temperature.

17. The drip-type coffee maker of claim 16, wherein said polymer is a copolymer of ethylene and vinyl acetate.

18. The drip-type coffee maker of claims 14, wherein the film further comprises a non-stick layer laminated onto an upper surface of said copolymer layer and has a melting point exceeding the brewing temperature.

19. The drip-type coffee maker of claim 18, wherein said non-stick layer covers less than the entire surface of the copolymer layer.

20. A beverage maker for use in a microwave device adapted to dispense a freshly brewed beverage, comprising:
 a reservoir for holding water to be heated to a temperature for brewing a beverage,
 a filter element adapted to hold a substance for brewing the beverage and to receive the heated liquid from said reservoir and dispense a freshly brewed beverage therefrom,
 a partition between said reservoir and filter element, including a film adapted to close and seal communication between said reservoir and filter element until the liquid in said reservoir is at a temperature for brewing the beverage, whereupon said film is adapted to be melted to provide at least one opening in said film for providing a communication between said reservoir and said filter element and allow the heated liquid to contact the substance and become a freshly brewed beverage,
 a compartment including a chamber adapted to receive the brewed beverage from said reservoir and to dispense the brewed beverage from the beverage maker, and
 co-acting means on said reservoir and said compartment for releasably securing said reservoir, compartment and filter element together.

21. The beverage maker of claim 20 for use as a coffee maker.

* * * * *